United States Patent
Khokle et al.

(10) Patent No.: US 12,525,778 B2
(45) Date of Patent: Jan. 13, 2026

(54) CABLE GLAND FOR USE IN HAZARDOUS ENVIRONMENTS

(71) Applicant: Eaton Intelligent Power Limited, Dublin (IE)

(72) Inventors: Himanshu Gangadhar Khokle, Pune (IN); Rahul Dattatray Sawant, Pune (IN)

(73) Assignee: EATON INTELLIGENT POWER LIMITED, Dublin (IE)

(*) Notice: Subject to any disclaimer, the term of this patent is extended or adjusted under 35 U.S.C. 154(b) by 274 days.

(21) Appl. No.: 18/453,472

(22) Filed: Aug. 22, 2023

(65) Prior Publication Data
US 2024/0072524 A1 Feb. 29, 2024

Related U.S. Application Data

(60) Provisional application No. 63/373,219, filed on Aug. 23, 2022.

(51) Int. Cl.
*H02G 3/22* (2006.01)
*F16L 5/06* (2006.01)

(52) U.S. Cl.
CPC . *H02G 3/22* (2013.01); *F16L 5/06* (2013.01)

(58) Field of Classification Search
CPC ...... H02G 3/0675; H02G 3/22; H02G 15/013; H02G 3/06; H02G 3/0666; H02G 15/04; H02G 15/24; F16L 5/06

(Continued)

(56) References Cited

U.S. PATENT DOCUMENTS 3,567,843 A * 3/1971 Collins ............... H02G 3/0616
285/341
3,739,076 A * 6/1973 Schwartz ............ H01R 13/648
174/75 C (Continued)

FOREIGN PATENT DOCUMENTS

CN 210156898 U 3/2020
FR 2794908 A1 12/2000

(Continued)

OTHER PUBLICATIONS

International Search Report issued in corresponding application No. PCT/EP2023/025384 dated Nov. 14, 2023, 3 pages.

(Continued)

*Primary Examiner* — Timothy J Thompson
*Assistant Examiner* — Michael F McAllister
(74) *Attorney, Agent, or Firm* — Stinson LLP

(57) ABSTRACT

A cable gland for use in a hazardous environment that includes a hub body having an opening extending therethrough. A gland nut is configured to engage an end of the hub body to define an inner cavity. The gland nut has a first inner annular step and a second inner annular step. A seal, ring and spring are disposed in the inner cavity. The spring is disposed in the inner cavity between a surface of the ring and an opposite-facing frustoconical surface. When the gland nut is in a first position, the first inner annular step engages the first end of the seal. When the gland nut is in a second position, the second inner annular step engages the ring and the seal is deflected radially inward. When the gland nut is in a third position, the spring is deflected radially inward.

15 Claims, 7 Drawing Sheets

(58) Field of Classification Search
USPC .......................................................... 174/650
See application file for complete search history.

(56) References Cited

U.S. PATENT DOCUMENTS

| | | | | |
|---|---|---|---|---|
| 4,030,741 | A * | 6/1977 | Fidrych | F16L 5/00 |
| | | | | 174/653 |
| 4,350,840 | A * | 9/1982 | Michaels | H02G 3/065 |
| | | | | 279/107 |
| 5,208,427 | A * | 5/1993 | Couto | H02G 15/04 |
| | | | | 174/653 |
| 6,034,325 | A | 3/2000 | Nattel et al. | |
| 8,692,139 | B2 * | 4/2014 | Aldrich | H02G 15/013 |
| | | | | 174/653 |
| 10,714,922 | B2 * | 7/2020 | Platt | H02G 3/0675 |
| 11,070,042 | B2 * | 7/2021 | Santoro | H02G 3/0675 |
| 11,245,253 | B2 | 2/2022 | Proud | |
| 2010/0108020 | A1 * | 5/2010 | Miretti | H02G 3/0675 |
| | | | | 174/653 |
| 2013/0056264 | A1 * | 3/2013 | Aldrich | H02G 15/013 |
| | | | | 174/665 |
| 2020/0106255 | A1 | 4/2020 | Platt et al. | |
| 2021/0234354 | A1 | 7/2021 | Reid et al. | |
| 2021/0344183 | A1 * | 11/2021 | Scarlata | H02G 3/0666 |

FOREIGN PATENT DOCUMENTS

| | | |
|---|---|---|
| FR | 2794909 A1 | 12/2000 |
| GB | 2106336 A | 4/1983 |
| GB | 2501329 A | 10/2013 |

OTHER PUBLICATIONS

Written Opinion issued in corresponding application No. PCT/EP2023/025384 dated Nov. 14, 2023, 7 pages.

* cited by examiner

CABLE GLAND FOR USE IN HAZARDOUS ENVIRONMENTS

FIELD

The subject application relates to cable glands. More particularly, an explosion proof cable gland for attaching an armored or un-armored cable to an explosion proof housing or enclosure for use in harsh and hazardous locations is provided.

BACKGROUND

Cable glands conventionally are used on enclosures to allow a cable, wire or tube to pass into the enclosure. The cable glands provide strain relief and a seal to prevent contaminants, such as dirt, dust and water from passing into the enclosure. When used on explosion-proof enclosures in harsh and hazardous locations, the cable gland must be designed to allow high temperature and high pressure flue gases from an explosion within the enclosure to be safely released into the surrounding environment.

Due to the multiple functions of the cable gland, conventional cable glands are three-piece assemblies that must be partly assembled by a user. These multiple parts increase installation time and each part must be catalog and tracked by the user.

The present invention provides a cable gland with fewer parts that meets the requirements of used in harsh and hazardous environments.

SUMMARY OF THE INVENTION

There is provide a cable gland for use in a hazardous environment. The cable gland includes a hub body having a first end, a second end and an opening extending between the first end and the second end. A gland nut is configured to engage the second end of the hub body to define an inner cavity between the hub body and the gland nut. The gland nut has a first inner annular step and a second inner annular step spaced from the first inner annular step. A seal is disposed in the inner cavity and has a first end positioned adjacent the first inner annular step, an opposite-facing second end. A ring is disposed in the inner cavity adjacent the second end of the seal. The ring has a first surface facing the seal and a second surface facing opposite the first surface. A spring is disposed in the inner cavity between the second surface of the ring and an opposite-facing frustoconical surface fixed in the inner cavity. When the gland nut is in a first position a first distance from the first end of the hub body, the first inner annular step engages the first end of the seal and the second inner annular step is spaced from the first surface of the ring. When the gland nut is in a second position a second distance from the first end, the second distance being less than the first distance, the second inner annular step engages the first surface of the ring and the seal is compressed by the first inner annular step and the first surface of the ring and deflected radially inward. When the gland nut is in a third position a third distance from the first end, the third distance being less than the second distance, the spring is deflected radially inward by the second surface of the ring and the opposite-facing frustoconical surface.

In the foregoing the cable gland, the opposite-facing frustoconical surface is formed on a first end of a chamber configured to be at least partially received into the opening of the hub body.

In the foregoing cable gland, the chamber and the hub body define a labyrinth joint therebetween.

In the foregoing cable gland, the labyrinth joint has a first end in communication with the opening of the hub body and a second end that opens into a space bounded by the gland nut, the chamber and the hub body.

In the foregoing cable gland, the labyrinth joint is at least partially defined between an annular tongue formed on the chamber and an annular groove formed in the hub body that is dimensioned to receive the annular tongue.

In the foregoing cable gland, the spring is a coiled wire that is formed into a ring.

In the foregoing cable gland, the ring has a rectangular cross section.

In the foregoing cable gland, the first end of the hub body is configured to engage a mating hole in an enclosure and the second end of the hub body has an external thread formed thereon.

In the foregoing cable gland, the gland nut includes an internal thread configured to engage the external thread on the hub body.

In the foregoing cable gland, an annular groove is formed on an outer cylindrical surface of the seal.

There is further provided a method for assembling a cable to an enclosure via a cable gland. The cable gland includes a hub body having a first end, a second end and an opening extending between the first end and the second end. A gland nut is configured to engage the second end of the hub body to define an inner cavity between the hub body and the gland nut. The gland nut has a first inner annular step and a second inner annular step spaced from the first inner annular step. A seal is disposed in the inner cavity and having a first end positioned adjacent the first inner annular step, an opposite-facing second end. A ring is disposed in the inner cavity adjacent the second end of the seal, the ring having a first surface facing the seal and a second surface facing opposite the first surface. A spring is disposed in the inner cavity between the second surface of the ring and an opposite-facing frustoconical surface fixed in the inner cavity. The method includes steps of: inserting a cable through the gland nut and the hub body; positioning the gland nut in a first position a first distance from the first end of the hub body, wherein the first inner annular step engages the first end of the seal and the second inner annular step is spaced from the first surface of the ring; moving the gland nut to a second position a second distance from the first end, the second distance being less than the first distance, wherein the second inner annular step engages the first surface of the ring and the seal is compressed by the first inner annular step and the first surface of the ring and deflected radially inward toward an outer surface of the cable; and moving the gland nut to a third position a third distance from the first end, the third distance being less than the second distance, wherein the spring is deflected radially inward by the second surface of the ring and the opposite-facing frustoconical surface toward the outer surface of the cable.

In the foregoing method, the step of moving the gland nut to the second position secures the cable in the inner cavity.

In the foregoing method, the step of moving the gland nut to the third position causes the spring to at least partially penetrate the outer surface of the cable.

In the foregoing method, the second end of the hub body includes an external thread formed thereon and the gland nut includes an internal thread configured to engage the external thread and the method of moving the gland nut to the first position or the second position includes torquing the gland nut relative to the hub body.

There is further provided a cable gland for use in a hazardous environment. The cable gland includes a hub body having a first end, a second end and an opening extending between the first end and the second end. The first end is configured to engage a mating hole in an enclosure and the second end having an external thread formed thereon. A gland nut is configured to engage the external thread on the hub body to define an inner cavity between the hub body and the gland nut. The gland nut has a first inner annular step and a second inner annular step spaced from the first inner annular step. A seal is disposed in the inner cavity and has a first end positioned adjacent the first inner annular step, an opposite-facing second end and an annular groove formed on an outer cylindrical surface of the seal. A ring is disposed in the inner cavity adjacent the second end of the seal, the ring having a first surface facing the seal and a second surface facing opposite the first surface. A spring is disposed in the inner cavity between the second surface of the ring and an opposite-facing frustoconical surface fixed in the inner cavity. When the gland nut is in a first position a first distance from the first end of the hub body, the first inner annular step engages the first end of the seal and the second inner annular step is spaced from the first surface of the ring. When the gland nut is in a second position a second distance from the first end, the second distance being less than the first distance, the second inner annular step engages the first surface of the ring and the seal is compressed by the first inner annular step and the first surface of the ring and deflected radially inward. When the gland nut is in a third position a third distance from the first end, the third distance being less than the second distance, the spring is deflected radially inward by the second surface of the ring and the opposite-facing frustoconical surface.

DETAILED DESCRIPTION

The following presents a description of the disclosure; however, aspects may be embodied in many different forms and should not be construed as limited to the embodiments set forth herein. Furthermore, the following examples may be provided alone or in combination with one or any combination of the examples discussed herein.

Figure 1:
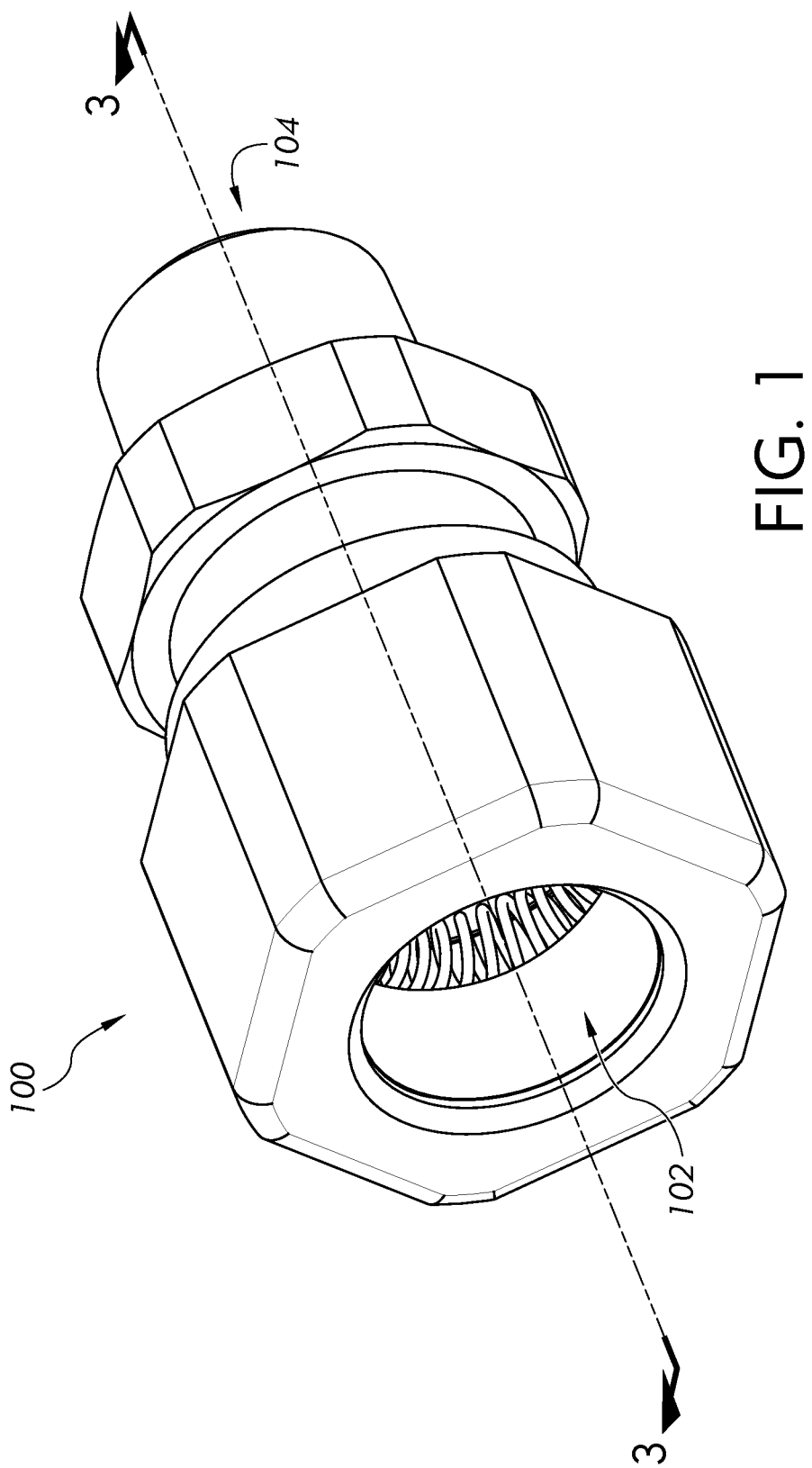
FIG. 1 is side perspective view of a cable gland; according to the present invention.
Figure 2:
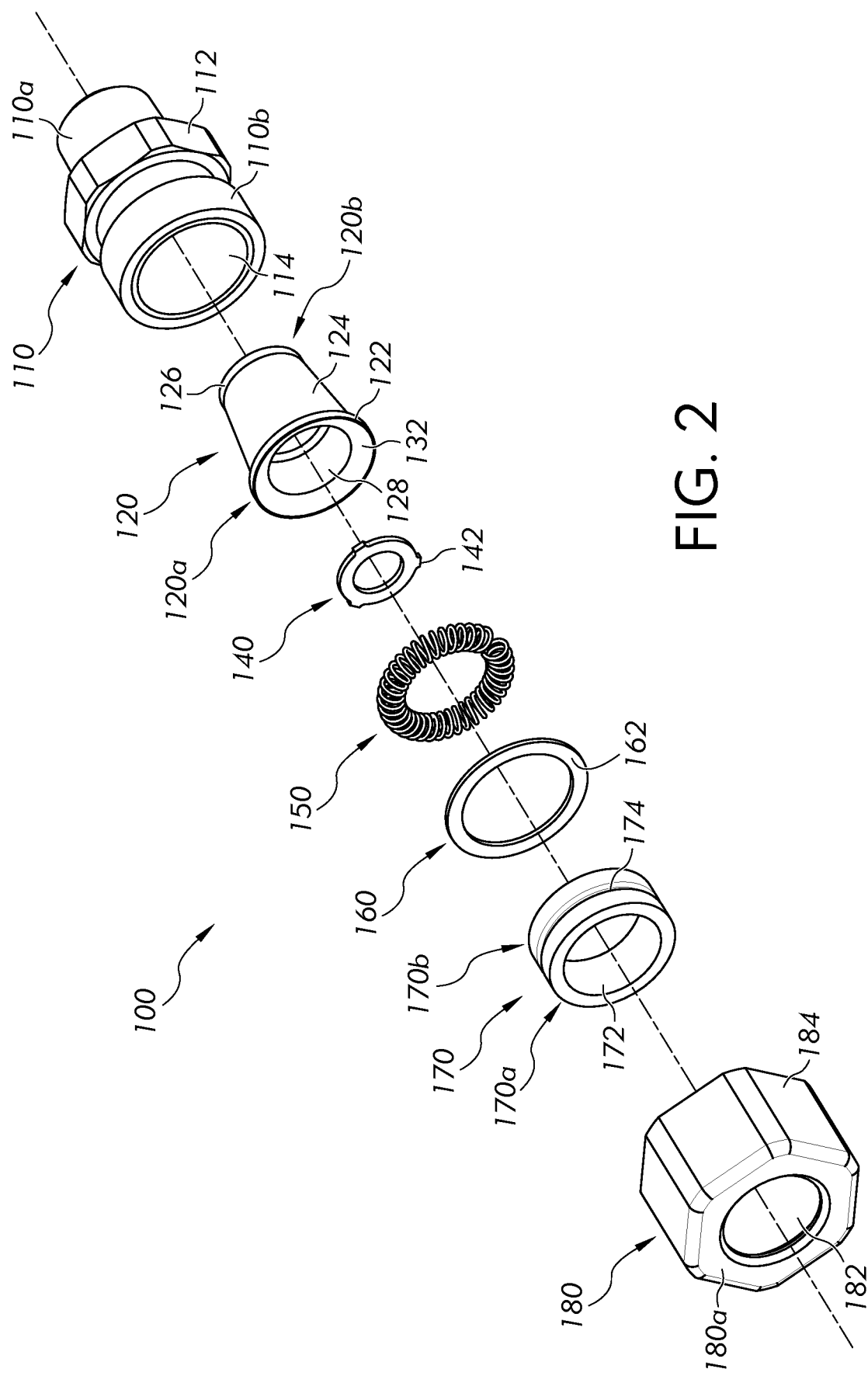
FIG. 2 is an exploded view of the cable gland of FIG. 1.

As shown in FIG. 1, a cable gland 100 has a first opening 102 and a second open end 104 through which a cable, wire or tube may extend. Referring to FIG. 2, the cable gland 100, in general, includes a hub body 110, a chamber 120, a stop 140, a spring 150, a ring 160, a bushing or seal 170 and a gland nut 180.

The hub body 110 includes a first end 110a and a second end 110b. The first end 110a includes eternal threads that are configured to thread into an enclosure 250 (FIG. 3), as described in detail below. The second end 110b includes external threads that are configured to engage internal threads on the gland nut 180. A central portion of an outer surface of the hub body 110 is contoured with flats 112 that are positioned in a hexagon-shaped arrangement for allowing a user to use a wrench or equivalent tool to apply torque to the hub body 110 when attaching the hub body 110 to the enclosure.

Figure 3:
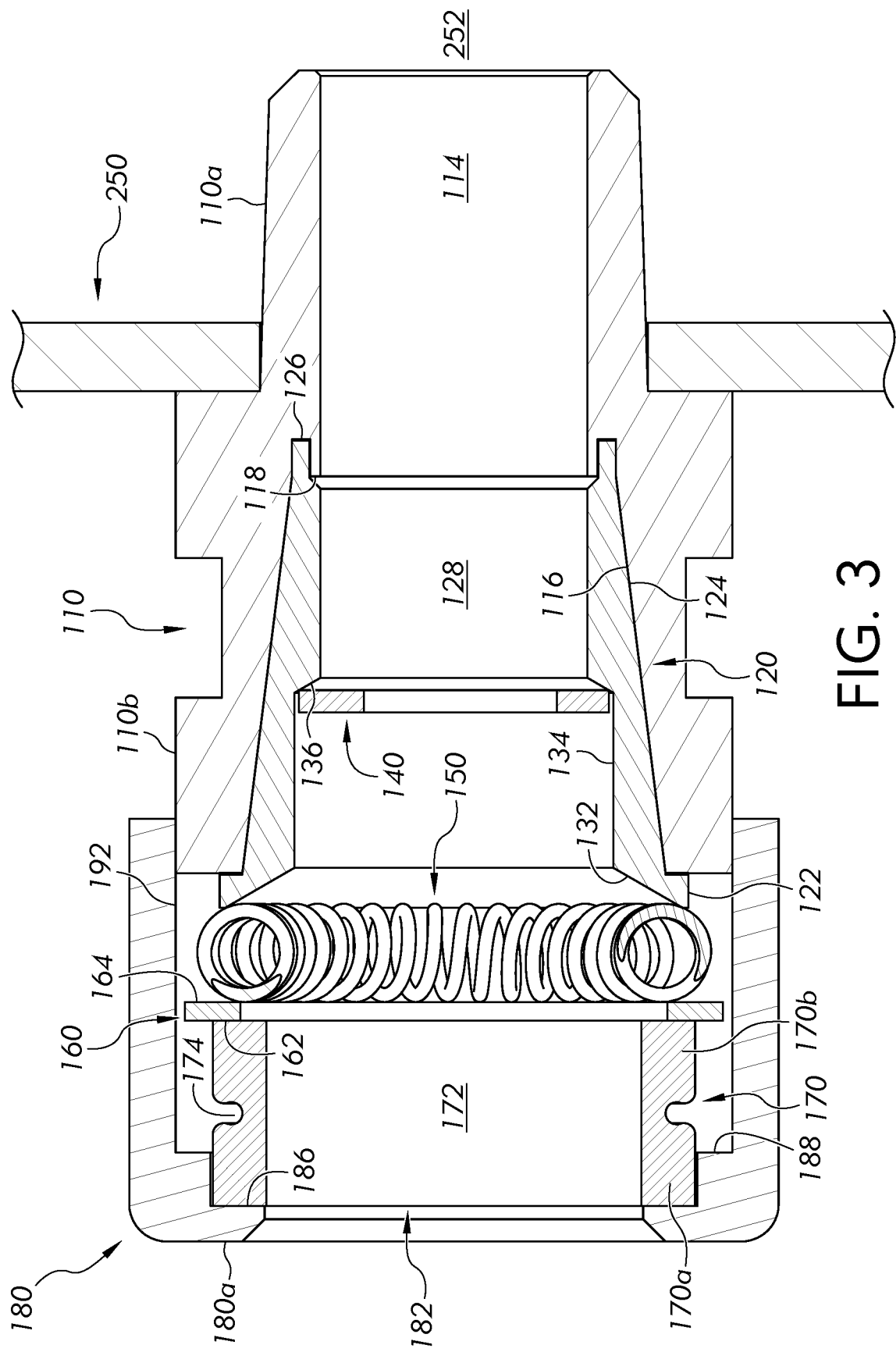
FIG. 3 is a side section view of the cable gland of FIG. 1 taken along line 3-3 of FIG. 1.

An opening 114 extends through the hub body 110. Referring to FIG. 3, the portion of the opening 114 on the second end 110b of the hub body 110 includes a conical surface 116 that terminates in groove 118. The conical surface 116 and the groove 118 are configured to receive mating surfaces of the chamber 120, as described in detail below.

Referring to back to FIG. 2, the chamber 120 is configured to be received into the opening 114 of the hub body 110. The chamber 120 includes a first end 120a and a second end 120b. A peripheral ledge 122 is formed at the first end 120a adjacent an outer conical surface 124. The outer conical surface 124 terminates at an annular tongue 126 at the second end 120b. The peripheral ledge 122, the conical surface 124 and the tongue 126 are configured and dimensioned to engage mating surfaces that define the opening 114 of the hub body 110, i.e., the second end 110b, the conical surface 116 (FIG. 3) and the groove 118 (FIG. 3), to define a labyrinth joint between the hub body 110 and the chamber 120, as described in detail below.

An opening 128 extends through the chamber 120 between the first end 120a of the chamber 120 and the opposite second end 120b. Referring to FIG. 3, the internal surface defining the opening 128 includes a first frustoconical surface 132 at the first end 120a that leads to a cylindrical-shaped surface 134 and a second frustoconical surface 136. The remaining inner surface is illustrated as being cylindrical-in-shape and it is contemplated that this surface may have other shapes.

The stop 140 is dimensioned to be received into the opening 128 of the chamber 120. Referring to FIG. 2, the stop 140 is illustrated as being a flat ring-shaped element having a plurality of tabs 142 on an outer periphery thereof. As illustrated n FIG. 3, the stop 140 is dimensioned to engage and rest on the second frustoconical surface 136 of the chamber 120 when the stop 140 is positioned into the opening 128.

Figure 4A:
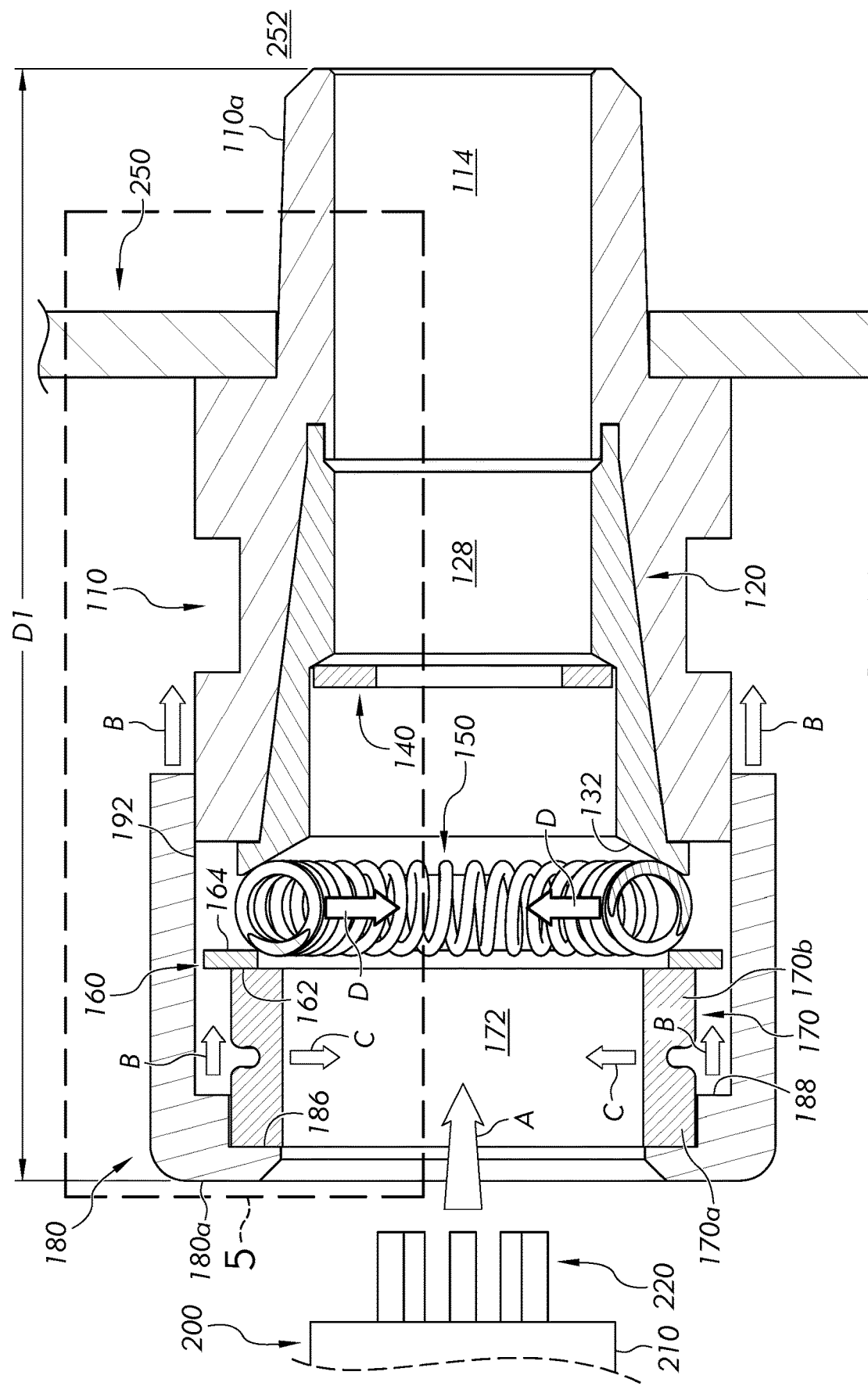
FIG. 4A is a side section view of the cable gland of FIG. 1 showing a cable proximate the cable gland with a gland nut of the cable gland in a first position.
Figure 4B:
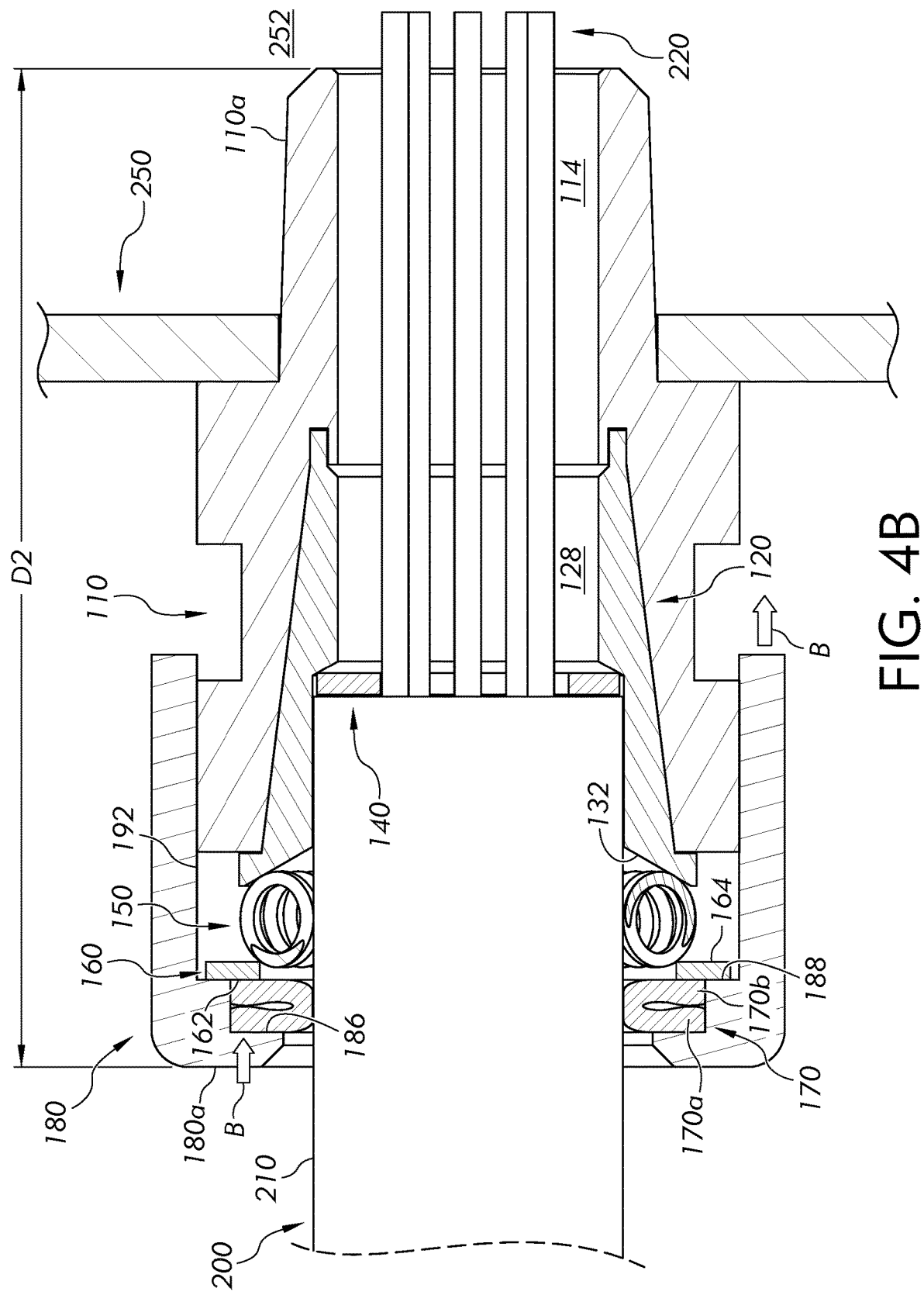
FIG. 4B is a side section view of the cable gland of FIG. 1 showing a cable proximate the cable gland with a gland nut of the cable gland in a second position.

Referring to FIG. 2, the spring 150 is dimensioned to engage the first end 120a of the chamber 120. The spring 150 is a coiled wire that is formed into a ring. As illustrated in FIGS. 3 and 4, the spring 150 is positioned to engage the first frustoconical surface 132 of the chamber 120, as described in detail below. The spring 150 is made from a metallic material and has a cross-sectional shape such that it can partially penetrate an outer jacket 210 of a cable 200 (FIGS. 4A-4B) to provide grounding and cable retention, as described below.

The ring 160 is dimensioned to be positioned adjacent the spring 150 opposite the first end 120a of the chamber 120. The ring 160 has a first surface 162 and a second surface 164 facing opposite the first surface 162. The ring 160 is illustrated as being a flat, ring-shaped element with a rectangular cross section. It is contemplated that the ring 160 may have other cross-sectional shapes.

The seal or bushing 170 is a tube-shaped element that is positioned adjacent the ring 160. The seal 170 has an inner opening 172 that extends between a first end 170a and a second end 170b of the seal 170. The second end 170b is positioned adjacent the ring 160 to engage a surface of the ring 160. The seal or bushing 170 is made from an elastic material, e.g., rubber or elastomer. It is contemplated that the elastic material may be silicon or neoprene. An annular groove 174 is formed in an outer cylindrical surface of the seal 170. The annular groove 174 is configured to cause an inner surface of the seal 170 (which defines the opening 172) to deflect inwardly when the first end 170a is compressed toward the second end 170b, as described in detail below.

Referring to FIGS. 3 and 4A-4C, the gland nut 180 is configured to engage the hub body 110 to capture the seal 170, the ring 160, the spring 150, the stop 140 and the chamber 120 in an inner cavity defined between the gland nut 180 and the hub body 110. The gland nut 180 is a cup-shaped element having an opening 182 in a base wall 180a thereof. An outer side surface of the gland nut 180 includes flats 184 that are positioned in a hexagon-shaped arrangement for allowing a user to use a wrench or equivalent tool to torque the gland nut 180.

An inner surface of the gland nut 180 includes a first inner annular step 186 and a second inner annular step 188. The first inner annular step 186 is dimensioned to engage the first end 170a of the seal 170 and the second inner annular step 188 is dimensioned to engage the ring 160, as described in detail below. The inner surface includes an inner threaded portion 192 that is dimensioned to engage the threads on the second end 110b of the hub body 110.

Referring to FIGS. 3 and 4A-4C, the cable gland 100 is preassembled by placing the chamber 120 into the opening 114 of the hub body 110. When positioned in the hub body 110, the conical surface 124 on the outer surface of the chamber 120 engages the conical surface 116 of the hub body 110 and the tongue 126 engages the groove 118.

The stop 140 is positioned within the opening 128 of the chamber 120 and abuts the second frustoconical surface 136 of the chamber 120. The spring 150 is positioned adjacent the first end 120a of the chamber 120 proximate the first frustoconical surface 132. The ring 160 is then positioned adjacent the spring 150 and the seal 170 is positioned adjacent the ring 160. The gland nut 180 is positioned to engage the hub body 110 to retain all the foregoing components between the gland nut 180 and the hub body 110. It is contemplated that before the gland nut 180 is secured to the hub body 110 that grease may be applied to the first end 170a of the seal 170 and the first inner annular step 186 of the gland nut 180. This grease may aid the gland nut 180 in rotating relative to the seal 170 so the seal 170 does not become distorted during torquing of the gland nut 180. As illustrated in FIG. 3, the opening 182 in the gland nut, the opening 172 of the seal, the opening 128 of the chamber and the opening 114 of the hub body 110 are dimensioned and positioned to align and define a continuous inner cavity from the first opening 102 of the cable gland 100 to the second opening 104 thereof.

As illustrated in FIG. 3, the seal 170 is retained between the first inner annular step 186 and the ring 160 and the spring is retained between the opposite surface of the ring 160 and the first frustoconical surface 132 of the chamber 120.

The present invention will now be described with respect to assembling a cable 200 (FIGS. 4A-4C) to an enclosure 250 (FIGS. 3-5) via the cable gland 100. The cable gland 100 initially is threaded into a mating opening in the enclosure 250 (FIGS. 3-5) via the external threads on the second end 110b of the hub body 110. In the embodiment illustrated, the enclosure 250 is made from metal such that the external threads engage a mating threaded opening. It is contemplated that the enclosure 250 may be made of plastic. In this embodiment (not shown), the opening in the enclosure 250 is a through hole and a nut (not shown) is provided for threading onto the second end 110b of the hub body 110. The nut and a flange of the hub body 110 clamp a wall of the enclosure 250 therebetween to secure the cable gland 100 to the enclosure 250.

Referring to FIG. 4A, the cable 200 may be prepared in advance by exposing the internal wires 220 from an outer jacket 210 of the cable 200. As the cable 200 is inserted into the cable gland 100 in the direction labeled "A," the wires 220 pass through the inner opening of the stop 140 but the outer jacket 210 is prevented from passing beyond the stop 140 due to the inner diameter of the stop 140 being smaller than the outer jacket 210. The cables 200 continue to pass into an inner cavity 252 of the enclosure 250 to terminate at the desired locations (not shown). It is also contemplated that, prior to inserting the cable 200 into the cable gland 100, the user may insert a barrier compound (e.g., an epoxy) into the cable gland 100 that cures around the cable 200 to fill any gaps between the outer surface of the cable 200 and inner surfaces of the cable gland 100.

Once the cable 200 is positioned in the cable gland 100, the outer surface of the outer jacket 210 is positioned adjacent the spring 150 and the seal 170. In this first position of the gland nut 180, the gland nut 180 is a first distance D1 from an end of the hub body 110 (see, FIG. 4A). The user then torques the gland nut 180 and the threads on the gland nut 180 and the hub body 110 are configured to cause the gland nut 180 to move from the first position (FIG. 4A) in the direction labeled "B" in FIG. 4A to a second position (FIG. 4B). In the second position, the gland nut 180 is a second distance D2 from the end of the hub body 110. The second distance is less than the first distance. As the gland nut 180 moves, the seal 170 is compressed between the first inner annular step 186 and the ring 160. Similarly, the spring 150 is compressed between the ring 160 and the first frustoconical surface 132 of the chamber 120. Because the seal 170 is made from an elastic material that has less rigidity than the spring 150, the continued torquing of the gland nut 180 compresses the seal 170 between the gland nut 180 and the ring 160 thereby causing the seal 170 to deflect inwardly in the direction labeled "C" in FIGS. 4A and 4B. The inward deflecting of the seal 170 causes the seal 170 to engage the outer surface of the outer jacket 210 and to seal thereagainst.

Figure 4C:
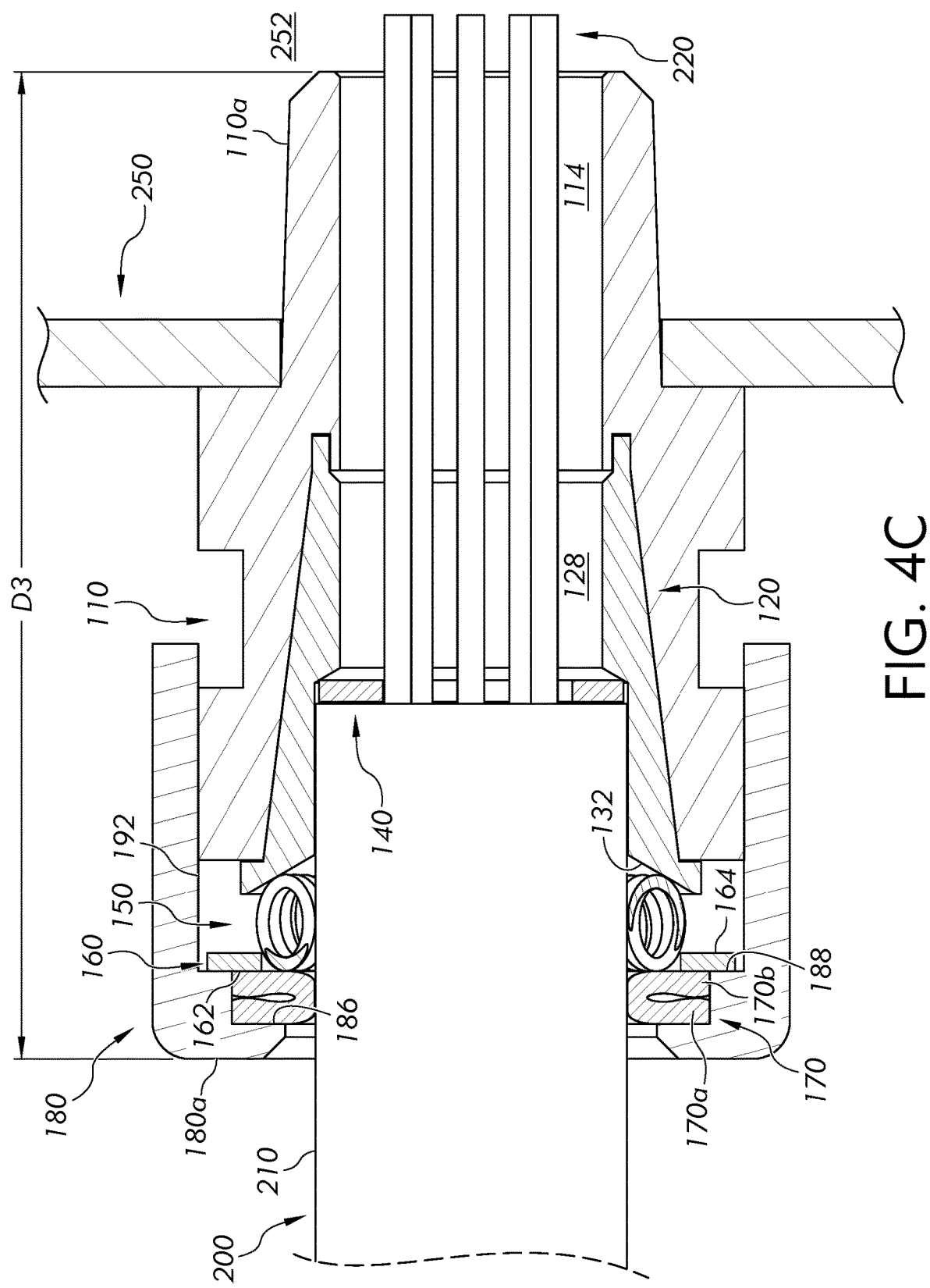
FIG. 4C is a side section view of the cable gland of FIG. 1 showing a cable proximate the cable gland with a gland nut of the cable gland in a third position.

The seal 170 continues to be compressed until the second inner annular step 188 engages the ring 160. Thereafter, continued torquing of the gland nut 180 causes the ring 160 to apply pressure to the spring 150. As the spring 150 moves toward the chamber 120, the first frustoconical surface 132 of the chamber 120 causes the spring 150 to deflect inwardly toward the outer surface of the outer jacket 210 in the direction labeled "D" in FIG. 4A. The spring 150 thereby engages and, optionally, partially penetrates the outer jacket 210 to provide grounding for the cable 200 and to help retain the cable 200 in the cable gland 100, as shown in FIG. 4C. The torquing of the gland nut 180 stops when a predetermined torque value is achieved depending on size of the cable gland 100. Torque values are typically defined by the manufacturers of the cable gland 100 after several experiments. For example, it is contemplated that a cable gland 100 may be torqued at 300 in.-lb. to 1600 in.-lb., depending on the size of the cable gland 100, to achieve the desired results. When the torquing is completed, the gland nut 180 is in a third position wherein the gland nut 180 is a third distance D3 from the end of the hub body 110. The third distance is less than the second distance.

Figure 5:
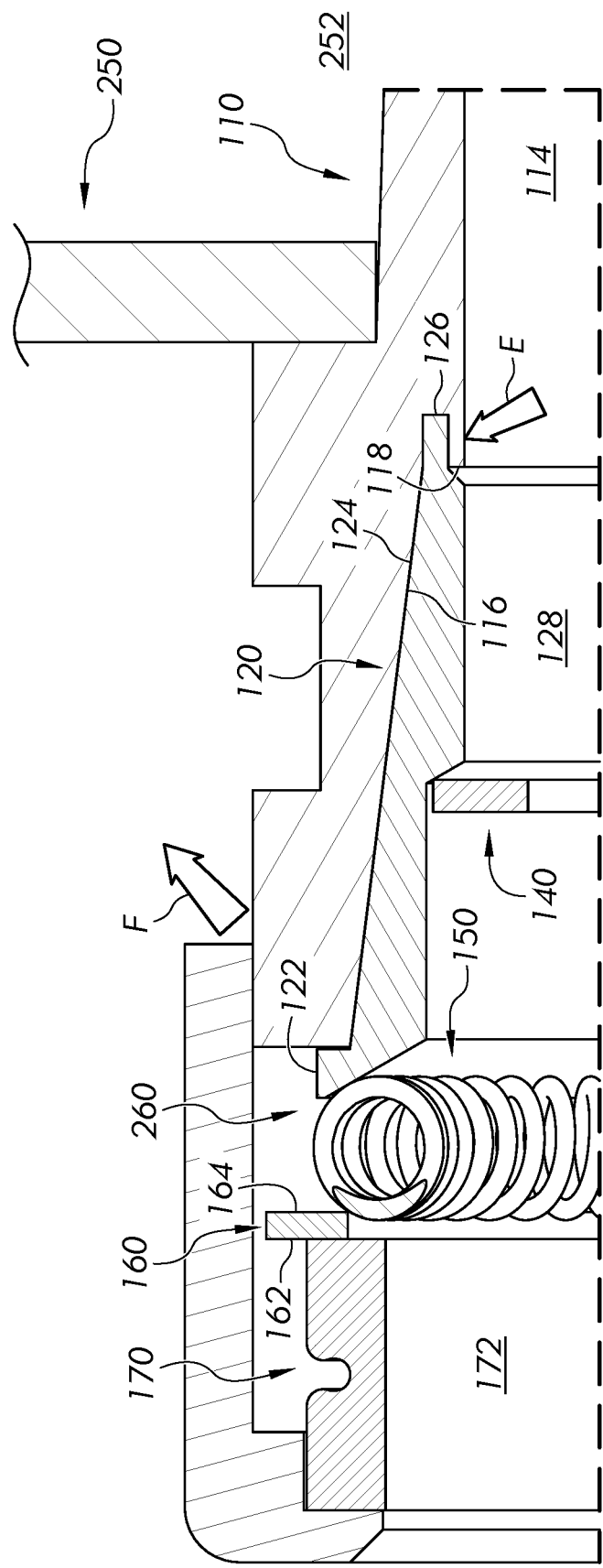
FIG. 5 is an enlarged side view of the cable gland taken from FIG. 4A.

Referring to FIG. 5, in addition to the grounding and retention of the cable 200 in the cable gland 100, the cable gland 100 also defines a labyrinth joint that is configured to dissipate the release of volatile gases from the inner cavity 252 of the enclosure 250 during an explosion therein. The labyrinth joint begins at the joint formed between the hub body 110 and the chamber 120. As noted above, the chamber 120 includes the tongue 126 the engages the groove 118 of the hub body 110. Proximate this engagement is an opening (see arrow "E") that defines an entrance to the labyrinth joint. The labyrinth joint continues between the conical surfaces 124 and 116 of the chamber 120 and the hub body 110, respectively. The gases passing along the labyrinth seal are injected into an area 260 within the gland nut 180. Due to the seal 170 and the barrier compound inserted by the user, the path of least resistance for the escaping gases is through the clearance gap formed between the external threads on the hub body 110 and the internal threads of the gland nut 180 when the gland nut 180 is attached to the hub body 110. Once the gases have navigated this clearance gap, they may exit to the surrounding environment (see, arrow "F"). The labyrinth joint and the tortuous path formed by the mating threads of the gland nut 180 and the hub body 110 are configured to reduce the volatility (e.g., temperature and pressure) of the gas escaping from the enclosure 250. The repeated turns and small openings tend to dissipate the energy of the escaping gases to a level that can be safely released into the harsh environment outside the enclosure 250. It is contemplated that the labyrinth joint may be 0.04 inches or smaller to help dissipate the energy of the escaping gases.

The present apparatus thereby provides a cable gland with reduce components, as compared to cable glands known heretofore that is configured to be used in harsh environments. The present apparatus also allows for quick assembly by providing for the ground and retention of a cable in the cable gland in one torquing motion of the gland nut.

It will be apparent to those skilled in the art that various modifications and variations can be made without departing from the spirit and scope of the claimed invention.

What is claimed is:

1. A cable gland for use in a hazardous environment, the cable gland comprising:
   a hub body having a first end, a second end and an opening extending between the first end and the second end;
   a gland nut configured to engage the second end of the hub body to define an inner cavity between the hub body and the gland nut, the gland nut having a first inner annular step and a second inner annular step spaced from the first inner annular step;
   a seal disposed in the inner cavity and having a first end positioned adjacent the first inner annular step, an opposite-facing second end;
   a ring disposed in the inner cavity adjacent the second end of the seal, the ring having a first surface facing the seal and a second surface facing opposite the first surface; and
   a spring disposed in the inner cavity between the second surface and an opposite-facing frustoconical surface fixed in the inner cavity,
   wherein,
      when the gland nut is in a first position a first distance from the first end of the hub body, the first inner annular step engages the first end of the seal and the second inner annular step is spaced from the first surface of the ring,
      when the gland nut is in a second position a second distance from the first end, the second distance being less than the first distance, the second inner annular step engages the first surface of the ring and the seal is compressed by the first inner annular step and the first surface of the ring and deflected radially inward, and
      when the gland nut is in a third position a third distance from the first end, the third distance being less than the second distance, the spring is deflected radially inward by the second surface of the ring and the opposite-facing frustoconical surface.

2. The cable gland according to claim 1, wherein the opposite-facing frustoconical surface is formed on a first end of a chamber configured to be at least partially received into the opening of the hub body.

3. The cable gland according to claim 2, wherein the chamber and the hub body define a labyrinth joint therebetween.

4. The cable gland according to claim 3, wherein the labyrinth joint has a first end in communication with the opening of the hub body and a second end that opens into a space bounded by the gland nut, the chamber and the hub body.

5. The cable gland according to claim 3, wherein the labyrinth joint is at least partially defined between an annular tongue formed on the chamber and an annular groove formed in the hub body that is dimensioned to receive the annular tongue.

6. The cable gland according to claim 1, wherein the spring is a coiled wire that is formed into a ring.

7. The cable gland according to claim 1, wherein the ring has a rectangular cross section.

8. The cable gland according to claim 1, wherein the first end of the hub body is configured to engage a mating hole in an enclosure and the second end of the hub body has an external thread formed thereon.

9. The cable gland according to claim 8, wherein the gland nut includes an internal thread configured to engage the external thread on the hub body.

10. The cable gland according to claim 1, wherein an annular groove is formed on an outer cylindrical surface of the seal.

11. A method for assembling a cable to an enclosure via a cable gland, the cable gland comprising:
   a hub body having a first end, a second end and an opening extending between the first end and the second end;
   a gland nut configured to engage the second end of the hub body to define an inner cavity between the hub body and the gland nut, the gland nut having a first inner annular step and a second inner annular step spaced from the first inner annular step,
   a seal disposed in the inner cavity and having a first end positioned adjacent the first inner annular step, an opposite-facing second end;
   a ring disposed in the inner cavity adjacent the second end of the seal, the ring having a first surface facing the seal and a second surface facing opposite the first surface; and
   a spring disposed in the inner cavity between the second surface of the ring and an opposite-facing frustoconical surface fixed in the inner cavity,
   the method comprising:

inserting a cable through the gland nut and the hub body;

positioning the gland nut in a first position a first distance from the first end of the hub body, wherein the first inner annular step engages the first end of the seal and the second inner annular step is spaced from the first surface of the ring;

moving the gland nut to a second position a second distance from the first end, the second distance being less than the first distance, wherein the second inner annular step engages the first surface of the ring and the seal is compressed by the first inner annular step and the first surface of the ring and deflected radially inward toward an outer surface of the cable; and moving the gland nut to a third position a third distance from the first end, the third distance being less than the second distance, wherein the spring is deflected radially inward by the second surface of the ring and the opposite-facing frustoconical surface toward the outer surface of the cable.

12. The method of claim 11, wherein the step of moving the gland nut to the second position secures the cable in the inner cavity.

13. The method of claim 11, wherein the step of moving the gland nut to the third position causes the spring to at least partially penetrate the outer surface of the cable.

14. The method of claim 11, wherein the second end of the hub body includes an external thread formed thereon and the gland nut includes an internal thread configured to engage the external thread and the method of moving the gland nut to the first position or the second position includes torquing the gland nut relative to the hub body.

15. A cable gland for use in a hazardous environment, the cable gland comprising:

a hub body having a first end, a second end and an opening extending between the first end and the second end, the first end configured to engage a mating hole in an enclosure and the second end having an external thread formed thereon;

a gland nut configured to engage the external thread on the hub body to define an inner cavity between the hub body and the gland nut, the gland nut having a first inner annular step and a second inner annular step spaced from the first inner annular step, a seal disposed in the inner cavity and having a first end positioned adjacent the first inner annular step, an opposite-facing second end and an annular groove formed on an outer cylindrical surface of the seal;

a ring disposed in the inner cavity adjacent the second end of the seal, the ring having a first surface facing the seal and a second surface facing opposite the first surface; and a spring disposed in the inner cavity between the second surface of the ring and an opposite-facing frustoconical surface fixed in the inner cavity, wherein, when the gland nut is in a first position a first distance from the first end of the hub body, the first inner annular step engages the first end of the seal and the second inner annular step is spaced from the second surface of the ring, when the gland nut is in a second position a second distance from the first end, the second distance being less than the first distance, the second inner annular step engages the first surface of the ring and the seal is compressed by the first inner annular step and the second surface of the ring and deflected radially inward, and when the gland nut is in a third position a third distance from the first end, the third distance being less than the second distance, the spring is deflected radially inward by the second surface of the ring and the opposite-facing frustoconical surface.

* * * * *